Jan. 16, 1968  A. R. CHRISTIE  3,363,931
ACCESSORY FOR AN AUTOMOBILE OR THE LIKE
Filed Feb. 16, 1966  2 Sheets-Sheet 1

Inventor
Alfred R. Christie
By Darbo, Robertson & Vandenburgh
Attorneys

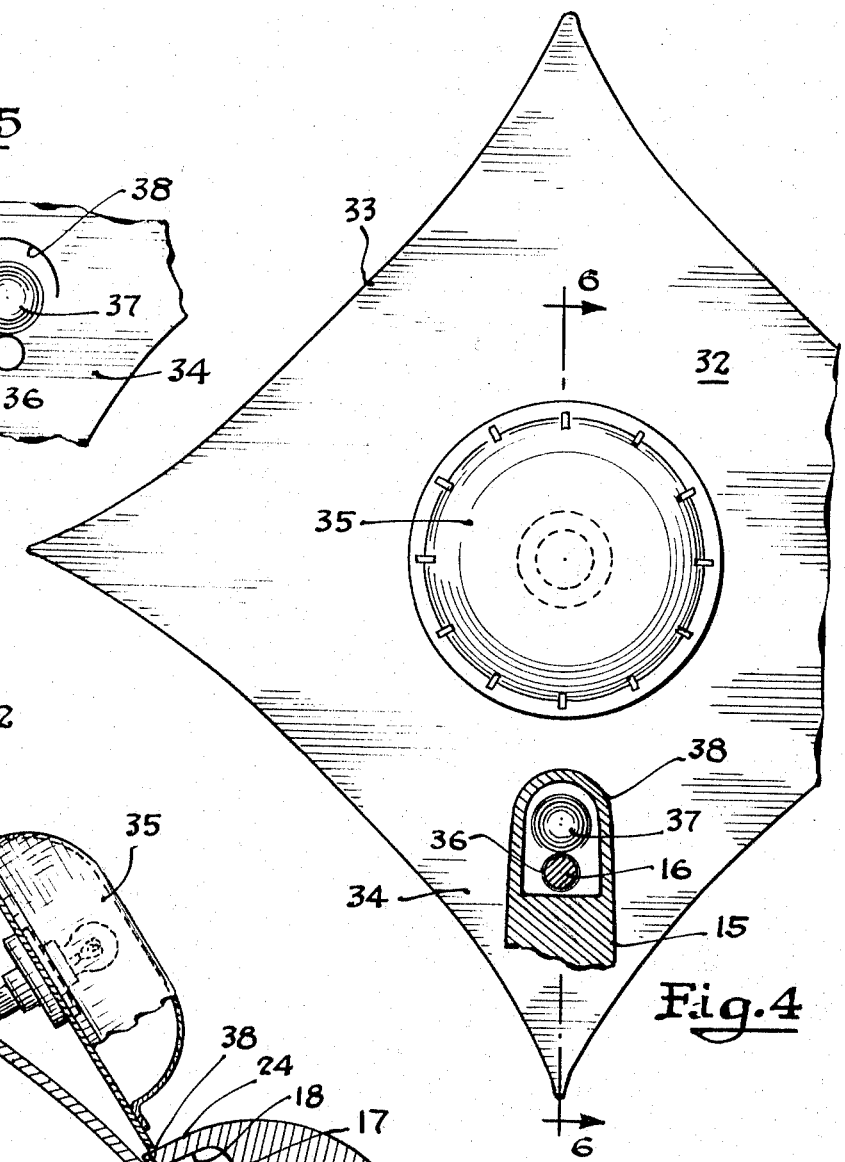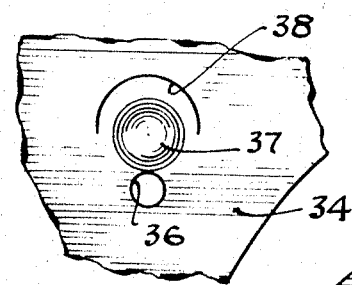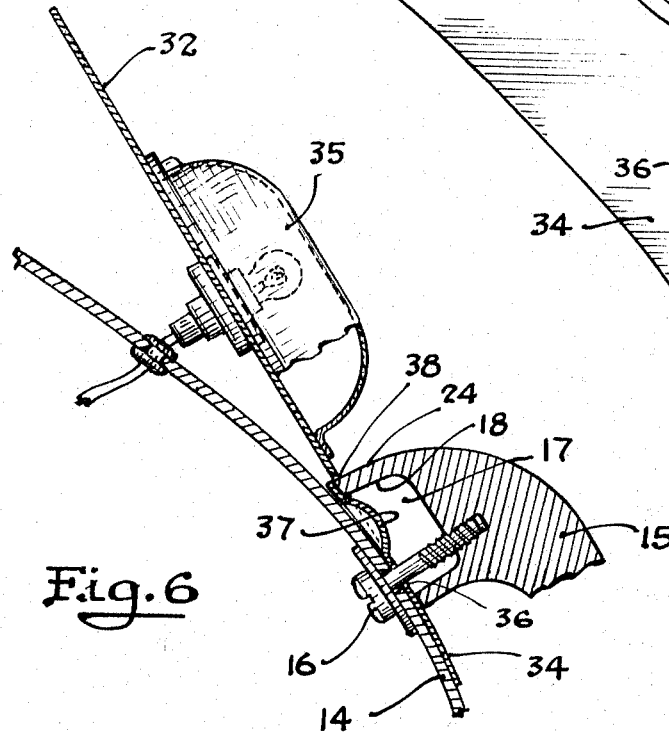

United States Patent Office 3,363,931
Patented Jan. 16, 1968

3,363,931
ACCESSORY FOR AN AUTOMOBILE
OR THE LIKE
Alfred R. Christie, 7748 Ardmore Ave.,
Chicago, Ill. 60631
Filed Feb. 16, 1966, Ser. No. 527,934
4 Claims. (Cl. 296—1)

The present invention relates to a mounting member particularly adapted for use in conjunction with the luggage compartment handle of a two-door Volkswagen automobile, and the following disclosure thereof is offered for public dissemination upon the grant of a patent therefor.

While the present invention was devised for use in conjunction with the front luggage compartment handle of a small Volkswagen automobile it will be apparent to those skilled in the art that it may be employed in conjunction with similarly situated handles and the like of other automotive vehicles. One of the important aspects of the present invention is to provide a mounting for the license plate of such a vehicle which mounting has a number of advantages as compared with the license plate mountings normally provided thereon. The normal license plate mountings for the two-door Volkswagen are provided so that the license plate is held immediately in front of the front bumper. Despite the existence of bumper guards and the like, experience has shown that a license plate in that position is invariably battered and dented. Not only does the license plate become unsightly, but the ability to read the indicia thereon may even become impaired. Utilizing the mounting member of the present invention the license plate is in such a position that such danger of damage does not exist. Furthermore the license plate becomes, if anything, more readily observable than when it is secured in juxtaposition to the bumper.

A second important advantage of embodiments of the invention is that the mounting member and license plates serve as a bug deflector to ameliorate the problem of bugs and the like spattering the windshield of the Volkswagen. The shape of the front hood of the two-door Volkswagen is such that the air flow about the front of the vehicle when its is motion, washes up directly across the windshield. The result is that bugs, muddy water droplets thrown up by preceding vehicles, etc., invariably splatter the windshield. When embodiments of the present invention are employed, they serve to create an upward air flow which is generally parallel to the windshield but spaced forwardly therefrom. This air flow is such as to tend to deflect bugs and other foreign material upwardly to an extent such that they will pass over the windshield without impinging thereon. Thus, there is less necessity for cleaning the windshield when the vehicle is employed under adverse circumstances.

While a principal purpose of the mounting member of the present invention is for the affixing of the license plate in a position such that it will not be damaged, the mounting member is not limited to this sole use. For example, as illustrated by an alternative embodiment herein, the mounting member may have other devices or decorations affixed thereto, or incorporated therein. The illustrated alternative embodiment has a light which may be employed as a "running light." In this instance the mounting member itself is made sufficiently large so as to serve as a wind deflector as previously described.

Further objects and advantages will become apparent from the following description taken in conjunction with the drawings in which:

FIGURE 4 illustrates the major portion of an alternative embodiment;

FIGURE 5 illustrates the confirmations employed on the mounting member to prevent rotation of the mounting member with respect to the handle with which it is employed;

FIGURE 6 is a section as viewed at line 6—6 of FIGURE 4.

Figures 1, 2, 3:
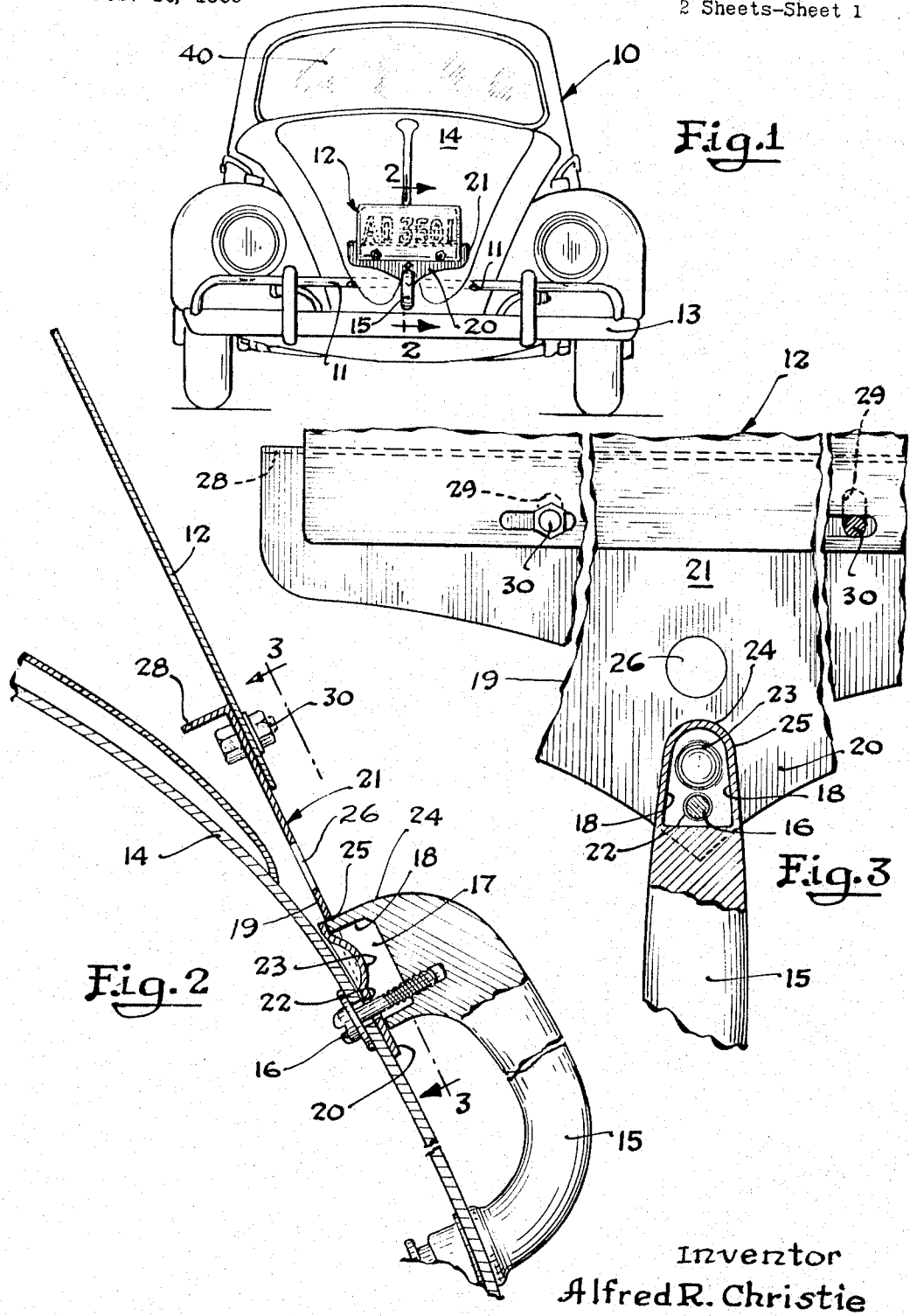
FIG. 1 illustrates the front of the conventional two-door Volkswagen with an embodiment of the invention utilized thereon as a mounting for the license plate.
FIGURE 2 is a section as viewed at line 2—2 of FIGURE 1.
FIGURE 3 is a partial section as viewed at line 3—3 of FIGURE 2.

Although the following disclosure offered for public dissemination is detailed to ensure adequacy and aid understanding, this is not intended to prejudice that purpose of a patent which is to cover each new inventive concept therein no matter how others may later disguise it by variations in form or additions or further improvements. The claims at the end hereof are intended as the chief aid toward this purpose; as it is these that meet the requirement of pointing out the parts, improvements, or combinations in which the inventive concepts are found.

FIGURE 1 illustrates the front of a two-door Volkswagen generally 10. In this view the horizontal guard 11 above the front bumper 13 has been broken away to facilitate illustrating the present invention. The standard practice is to hang the license plate 12 on clips secured to guard 11. The license plate 12 then hangs down in front of the front bumper 13. Invariably the license plate becomes damaged when so mounted.

The front luggage compartment of this automobile has a lid or door 14 which is opened by means of a handle 15. The upper end of handle 15 is secured to door 14 by means of a screw 16 threaded into the handle. The top end of the handle has an internal recess 17 defined by sides 18 of the handle.

The mounting member generally 19 of the present invention includes a lower portion 20 and an upper portion 21. The lower portion 20 is received between handle 15 and door 14, lying in juxtaposition to the outer surface of the door. As best seen in FIGURE 2, the upper portion 21 projects upwardly in a plane spaced from the outer surface of hood or door 14. The lower portion has an opening 22 to receive screw 16. Above opening 22 is a dimple 23. Dimple 23 just fits within the inner side walls 18. The sheet from which the mounting member was made was formed with a semi-circular slot 25 conforming in shape and position to the outside of the upper end 24 of handle 15. This sheet was then bent so that the edge of slot 25 of the mounting member fits about the upper end or nose 24 of handle 15. To the extent that the mounting member might seek to turn with respect to the handle about the pivotal axis defined by bolt or screw 16, the confirmations 23 and 25 resists such rotational movement.

Just above the slot 25 in the mounting member 19 is a hole 26 for mounting a socket for a daytime running light.

Horizontally across the upper portion 21 there is a reinforcing flange or rib 28. Also there are holes 29 to receive bolts 30 for securing license plate 12 to the mounting member.

In the embodiment of FIGURES 4, 5, and 6 the mounting member generally 32 comprises an upper portion 33 and a lower portion 34. The upper portion 33 has a light 35 mounted thereon. The lower portion has an opening 36 to receive bolt 16, a dimple 37 to be received in recess 17 and engage walls 18, and an edge slot 38 to fit about upper end 24 of handle 15.

As best seen from FIGURES 1 and 2 the wind striking the upper part of the mounting member and the license plate will be deflected upwardly in a plane approximately parallel to the windshield 40 of the automobile. This upwardly air current will tend to deflect bugs and other foreign material away from the windshield.

I claim:

1. A mounting member for use on an automobile having a compartment at one end thereof which compartment has a door with a handle thereon and the handle is secured to the door with a detachable affixing means, said member including: an approximately planar mounting portion adapted to be received between the handle and the door and held in place by the handle when the handle is so secured to the door, said member having a second portion extending a substantial distance upwardly from said first portion, said second portion being spaced from said door, said member having projecting conformation means fitting and engaging sides of said handle to resist rotation of the member with respect to the handle, said affixing means is a screw threaded into the handle, and said conformation means is about the outer sides of the upper end of the handle and also the inner sides of the handle defining a recess.

2. A mounting member as set forth in claim 1, wherein said member has a light mounted on the second portion thereof.

3. A mounting member as set forth in claim 1, wherein said second portion of said member includes means serving as a wind deflector for the windshield of said automobile.

4. A mounting member as set forth in claim 1, wherein said second portion has a horizontal reinforcing rib and means for securing a license plate thereto, whereby said license plate and the second portion serve as a wind deflector for the windshield of the automobile.

References Cited

UNITED STATES PATENTS 2,241,647    5/1941    Simon _____ 269—1

BENJAMIN HERSH, *Primary Examiner.*

P. GOODMAN, *Examiner.*